(12) United States Patent
Bleacher et al.

(10) Patent No.: US 8,605,917 B2
(45) Date of Patent: Dec. 10, 2013

(54) PASSENGER CONTROL UNIT FOR AN IN-FLIGHT ENTERTAINMENT SYSTEM

(75) Inventors: Brett Bleacher, Rancho Santa Margarita, CA (US); Mark Thompson, Rancho Santa Margarita, CA (US); Robert Kandel, Lake Forest, CA (US)

(73) Assignee: Thales Avionics, Inc., Irvine, CA (US)

( * ) Notice: Subject to any disclaimer, the term of this patent is extended or adjusted under 35 U.S.C. 154(b) by 1083 days.

(21) Appl. No.: 11/880,402

(22) Filed: Jul. 20, 2007
(Under 37 CFR 1.47)

(65) Prior Publication Data
US 2008/0157997 A1 Jul. 3, 2008

Related U.S. Application Data

(60) Provisional application No. 60/807,951, filed on Jul. 21, 2006.

(51) Int. Cl.
*H04B 1/00* (2006.01)
(52) U.S. Cl.
USPC .................................. 381/86; 725/76; 725/77
(58) Field of Classification Search
USPC ....................... 381/86, 311, 333, 334; 700/94; 725/74–77
See application file for complete search history.

(56) References Cited

U.S. PATENT DOCUMENTS

| | | | | |
|---|---|---|---|---|
| 4,835,604 A * | 5/1989 | Kondo et al. | ...... | 725/76 |
| 5,276,692 A * | 1/1994 | Kwon | ...... | 714/704 |
| 5,835,127 A * | 11/1998 | Booth et al. | ...... | 725/76 |
| 5,889,466 A * | 3/1999 | Ferguson | ...... | 340/602 |
| 6,246,400 B1 * | 6/2001 | Bush | ...... | 715/721 |
| 6,266,815 B1 * | 7/2001 | Shen et al. | ...... | 725/76 |
| 6,813,777 B1 * | 11/2004 | Weinberger et al. | ...... | 725/76 |
| 6,954,804 B2 * | 10/2005 | Lam et al. | ...... | 710/14 |
| 7,123,243 B2 * | 10/2006 | Kawasaki et al. | ...... | 345/173 |
| 7,197,364 B2 * | 3/2007 | Chernoff et al. | ...... | 700/9 |
| 7,228,188 B1 * | 6/2007 | Aihara et al. | ...... | 700/94 |
| 7,280,825 B2 * | 10/2007 | Keen et al. | ...... | 455/431 |
| 7,562,377 B2 * | 7/2009 | Allison et al. | ...... | 725/45 |
| 7,593,782 B2 * | 9/2009 | Jobs et al. | ...... | 700/94 |
| 7,945,934 B2 * | 5/2011 | Margis et al. | ...... | 725/75 |
| 2002/0197064 A1 * | 12/2002 | Bijsmans et al. | ...... | 386/96 |
| 2005/0062695 A1 | 3/2005 | Cok | | |

(Continued)

FOREIGN PATENT DOCUMENTS

WO WO2005/043935 A2 5/2005

OTHER PUBLICATIONS

Extended European Search Report, EP 07810660.6, Dec. 1, 2011.

*Primary Examiner* — Vivian Chin
*Assistant Examiner* — Fatimat O Olaniran
(74) *Attorney, Agent, or Firm* — Myers Bigel Sibley & Sajovec (57) ABSTRACT

A hand-held passenger control unit for use by a passenger on an aircraft or any other type of vehicle is provided. The control unit may include a controller, a memory, and a display panel. The control unit may have a first and a second mode of operation. In the first mode of operation, the control unit controls its own display panel. In the second mode of operation, the control unit controls a remote video display unit that is disposed proximate to the passenger. The control unit may also have an integrated audio player, thereby permitting passengers to bring their own audio content aboard the aircraft without having to bring their own audio players.

21 Claims, 4 Drawing Sheets

(56) References Cited

U.S. PATENT DOCUMENTS

| | | | |
|---|---|---|---|
| 2005/0097478 A1* | 5/2005 | Killian et al. | 715/851 |
| 2005/0144638 A1 | 6/2005 | Allison et al. | |
| 2005/0177252 A1 | 8/2005 | Chernoff et al. | |
| 2006/0083388 A1* | 4/2006 | Rothschild | 381/81 |
| 2006/0143662 A1* | 6/2006 | Easterling et al. | 725/76 |
| 2006/0270373 A1* | 11/2006 | So | 455/306 |

\* cited by examiner

PASSENGER CONTROL UNIT FOR AN IN-FLIGHT ENTERTAINMENT SYSTEM

CROSS-REFERENCE TO RELATED APPLICATIONS

This application claims the benefit of U.S. Provisional Application No. 60/807,951, filed Jul. 21, 2006, the entire content being incorporated herein by reference.

TECHNICAL FIELD

The present invention relates to a passenger control unit for an in-flight entertainment system and a method for using the same.

BACKGROUND OF THE INVENTION

The availability of and the type of in-flight amenities helps to differentiate airlines in the increasingly commoditized business of air travel. Airlines may offer in-flight media options such as audio and movies to their passengers. One problem with conventional in-flight audio delivery mechanisms, however, is that the same music selections are piped to all passengers on an aircraft. Passengers who do not want to listen to the canned selections of the airline are thus forced to bring their own personal audio players and audio content, hoping that their batteries last for the duration of the flight. Thus, there is a need for a device and system that addresses the foregoing problem. Also, due to space and weight limitations on an aircraft, it is also desirable that such a device and system by multifunctional, and have the ability to perform tasks beyond the playing of audio content.

BRIEF SUMMARY OF THE INVENTION

In accordance with the foregoing, a hand-held passenger control unit for use by a passenger on an aircraft or any other type of vehicle is provided. In an embodiment of the invention, the control unit includes a controller, a memory, keypad, and a display panel. In this embodiment, the control unit has at least a first and a second mode of operation. In the first mode of operation, the control unit controls its own display panel. In the second mode of operation, the control unit controls a remote video display unit that is disposed proximate to the passenger. The control can have a substantially X-shaped keypad, as well as an attendant call button and an LED light that illuminates when the call button is pressed. The cabin electronic system may provide a signal to the control unit to extinguish the LED light once the call has been answered.

Various implementations of the control unit are possible. For example, the control unit may control, in response to a user's manipulation, the volume of an amplifier that is external to the control unit. In this implementation, the control unit may display a heading indicative of volume on the display panel, and may transmit a signal to limit the volume of the amplifier during a passenger announcement or public address.

The control unit may also be used by a passenger to control an on-screen menu of a video display unit disposed near the passenger (such as in the seat back in front of the passenger).

In another implementation, the control unit doubles as an audio player. A passenger may, for example, insert an external memory into a port on the control unit, from which the control unit downloads and decodes songs. The control unit then provides audio signals for the songs through a speaker, such as a headset.

A method of delivering multimedia content to an aircraft passenger is also provided. An embodiment of the method involves receiving the connection of a video display unit, receiving the connection of a hand-held audio player, receiving the connection of a headset, receiving video content from an on-board computer network, transmitting the video content to the video display unit, receiving audio content from the hand-held audio player, and transmitting the audio content through the headset. According to this embodiment, the video display unit displays the video content to the passenger, and the audio player both receives the connection of an external memory device and downloads audio content from the external memory device. An electronics box that is disposed proximate to the passenger's seat may perform the receiving step.

In some embodiments, the audio player detects the audio content on the external memory device (to which power is provided) and displays data regarding the audio content on a display screen integrated with the audio player. The audio player may also select a title to download by title.

A system for providing in-flight entertainment to a passenger on an aircraft is also provided. An embodiment of the system includes a computer network, a video display unit disposed proximate to a passenger seat on the aircraft, the video display unit being communicatively linked to the computer network and receiving multimedia content from the computer network. The system of this embodiment also includes a passenger control unit communicatively linked to the video display unit. The passenger control unit executes software for downloading audio files and transmitting them to a speaker and for permitting the passenger control unit to control the functioning of the video display unit.

The system may further include a temperature sensor, a device to monitor voltages provided to the passenger control unit. The passenger control unit may include a display panel, a controller, a memory, a USB interface and a user input mechanism. The system my further include an external device that can be connected to the passenger control unit by the USB interface and from which the audio files can be downloaded into the passenger control unit.

DETAILED DESCRIPTION OF THE EMBODIMENTS

Figure 1:
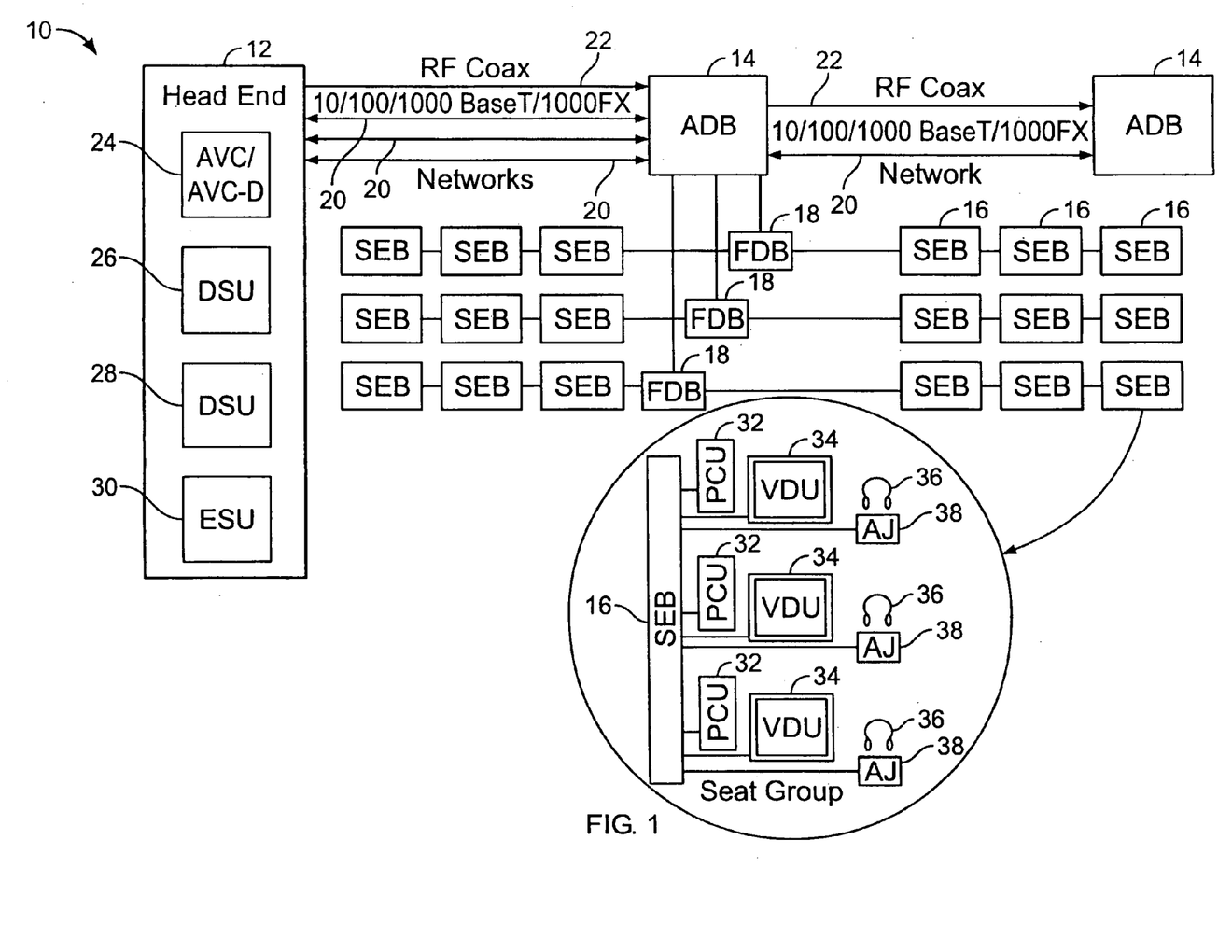
FIG. 1 illustrates an embodiment of an in-flight entertainment system, which delivers multimedia content to airline passengers.

Referring to FIG. 1, an in-flight entertainment system in which the passenger control unit is deployed in an embodiment of the invention will now be described. The system, generally labeled 10, includes a head end unit 12, one or more area distribution boxes (ADBs) 14, one or more seat electronic boxes (SEBs) 16, one or more floor disconnect boxes (FDBs) 18, a local area network (LAN) 20, and one or more RF links 22. The head end unit 12 includes an audio-video controller (AVC) 24, a first digital server unit (DSU) 26, a second DSU 28 or an AVC-D 24, and an Ethernet switching unit (ESU) 30. The head end 12 is communicatively linked to the ADBs 14, and the ADBs 14 are communicatively linked to one another, via the LAN 20 and the RF links 22. As shown in FIG. 1, each ADB 14 is communicatively linked to one or more of the FDBs 18. The FDBs 18 are, in turn, communicatively linked to the SEBs 16. The LAN 20 and the RF links 22 may be implemented in a variety of ways, but are depicted in FIG. 1 as an Ethernet-based network and RF coaxial links, respectively. It is understood that the LAN 20 may be wireless, and that the RF links may alternatively be digital. Additionally, the LAN 20 may be implemented as one or more Gigabit Copper or Fiberoptic Ethernet networks. Naturally, the embodiments described herein can be employed in any type of vehicle, such as an aircraft, bus, train, ship, and so on.

Referring still to FIG. 1, each SEB 16 is associated with a group of passenger seats ("seat group"). There may be any number of seats in a seat group, but three are depicted in FIG. 1. In the embodiment in FIG. 1 there is associated with each seat in a seat group is a passenger control unit (PCU) 32, a video display unit (VDU) 34, and a headset 36 that plugs into an audio jack (AJ) 38. The SEB 16 is communicatively linked to the PCU 32, the VDU 34, and the AJ 38. Each VDU 34 is associated with one of the SEBs 16. However, in an alternative embodiment, a VDU 34 might not be associated with a seat.

According to an embodiment of the invention, the VDU 34 is a terminal that a passenger can use to communicate over the LAN 20. The VDU 34 may be mounted in a variety of locations in the cabin, such as on a seat-back, on an arm mount, or on the cabin wall. Each VDU 34 includes a display and a housing. Each VDU 34 has full access to the LAN 20, thereby allowing the system 10 to present video graphics, video-on-demand, audio-on-demand, local games, and web content to each passenger. The passenger's access to the LAN 20 also allows the passenger to play network-based games with other passengers over the LAN 20 or over the Internet. Other types of content that may be delivered to the passengers includes satellite TV, digital radio, external internet (from an external provider), web portal access, eBook content, all types of MPEG content (including MPEG-4), picture in picture, and voice over IP (VoIP). This content may be obtained from electronic storage that is internal to the aircraft, from a land connection (when the aircraft is on the ground), or from various wireless connections, such as Swift-64 and Ku-band data communications.

In various embodiments of the invention, the display of the VDU 34 is a color LCD screen, and the VDU 34 further includes a housing, internal hardware within the housing that receives power, NTSC (M) video, and Ethernet data (MPEG-1/MPEG-2/MPEG-4 streaming video/audio) from the SEB 16 associated with the VDU 34. The internal hardware of the VDU 34 includes a power interface printed circuit board (PCB) with a backlight inverter power supply, and a processor printed circuit board (PCB).

The head end unit 12 can transmit video content over the LAN 20 or the RF links 22 to the ADB 14 which in turn transmits the video content to at least one FDB which sends it to at least one SEB 16. The SEB receives the video content and transmits it to the VDU 34 which then displays the video content to the passenger for viewing.

Figure 2:
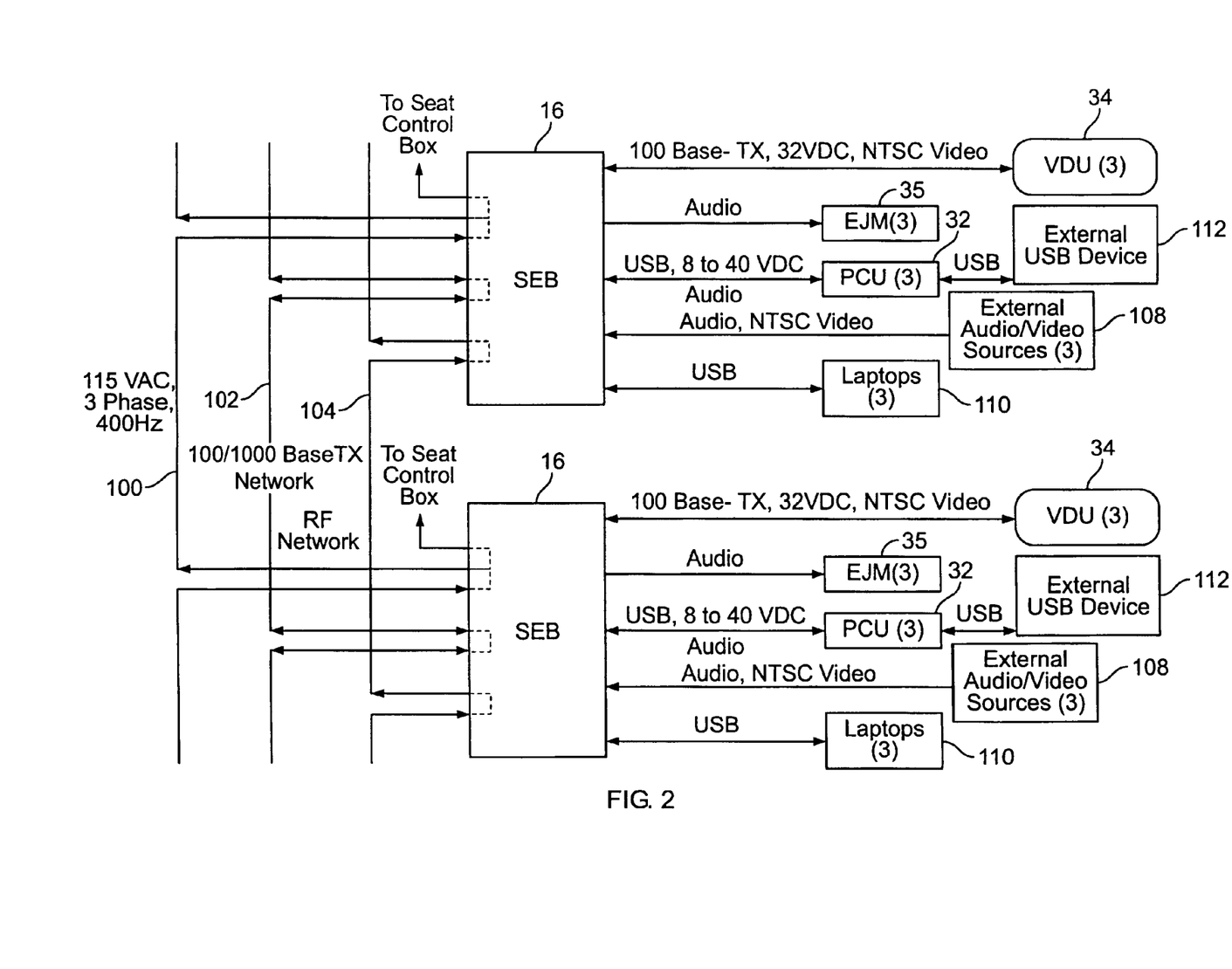
FIG. 2 is a diagram illustrating a more detailed embodiment of the in-flight entertainment system, including the seat electronics box (SEB) and the Passenger Control Unit (PCU)

Referring to FIG. 2, certain aspects of the in-flight entertainment system according to an embodiment of the invention will now be described. In this embodiment, there are multiple SEBs 16, each of which is linked to the system 10 via power lines 100, ethernet links 102, and RF links 104. There are a variety of components that may be communicatively linked to the SEBs 16, including a VDU 34, an electrical audio jack module (EJM) 35 (an audio jack 38 and a listening device 36 as shown in FIG. 1), a PCU 32, an external audio and/or video source 108, and a laptop 110. The PCU 32 may be also communicatively linked to an external device 112. (FIG. 2 depicts quantity of 3 PCUs with 3 EJMs, laptops, external USB devices or external audio/video sources interfaces but may include 4 or more under other configurations. Using the PCU 32 the passenger can call the flight attendant, turn the overhead reading light on or off and navigate on screen menus using an X-pad or rollerball control. The PCU 32 also permits the passenger to control the operating mode of the VDU 34, change the audio channel up or down and increase or decrease the volume. Other functions of their PCU 32 will be described in more detail below.

Referring again to FIG. 2, each PCU 32 is linked to an SEB 16 to receive and/or send power, data and audio output. One embodiment of the power interface between the PCU 32 and the SEB 16 is as follows. The PCU 32 receives 28 to 36 Volts DC at a current not to exceed 0.25 amps. If the Maximum Power Consumption is tested at the Organic Light Emitting Diode's (OLED's) maximum brightness, the current does not exceed 0.30 amps. The in-rush current does not exceed 1.0 amp for 100 milliseconds. In this embodiment the PCU 32 connector, power pins and printed circuit board are designed to handle current of up to 1.0 Amps, so the actual PCU 32 power consumption varies based on the functions being utilized but are no greater than 3 Watts at full load. The SEB 16 provides the PCU 32 up to 3 Watts of power for short periods of time.

According to one embodiment, the PCU 32 has a USB 1.1 device port for communication with USB 1.1 host port on the SEB 16. Alternately, the SEB 16 can use a USB 2.0 port that is able to adjust its speed down to the USB 1.1 full speed requirement (12 Mbps).

In an embodiment of the invention, each PCU 32 has an external interface for communication with an external device 112. In one embodiment the external interface is over USB 1.1 and the PCU 32 is the host for an external device 112 through a mini-A-B USB Connector. This interface enables a passenger to listen to audio content stored on an external device such as a portable memory. A passenger can for example bring a portable memory containing their personalized choice of audio content onto the aircraft and insert the memory into the external device interface of the PCU 32. The PCU 32 then locates the audio files stored on the external memory and displays the titles of the songs stored in the audio files on the display 34. Using the X-pad, the passenger then navigates the display 34 to select one or more of the displayed titles. In response, the PCU 32 downloads the files. The PCU 32 receives the external audio file over the USB host connection and transmits a stereo audio signal to amplifiers in the SEB 16. The SEB transmits the audio signals to the audio jack 38 (FIG. 1) and the passenger can hear their downloaded audio content by using a listening device such as headphones 36 (FIG. 1). The audio output is 2.2 Volts peak to peak full scale into 600 Ohms.

Figure 3:
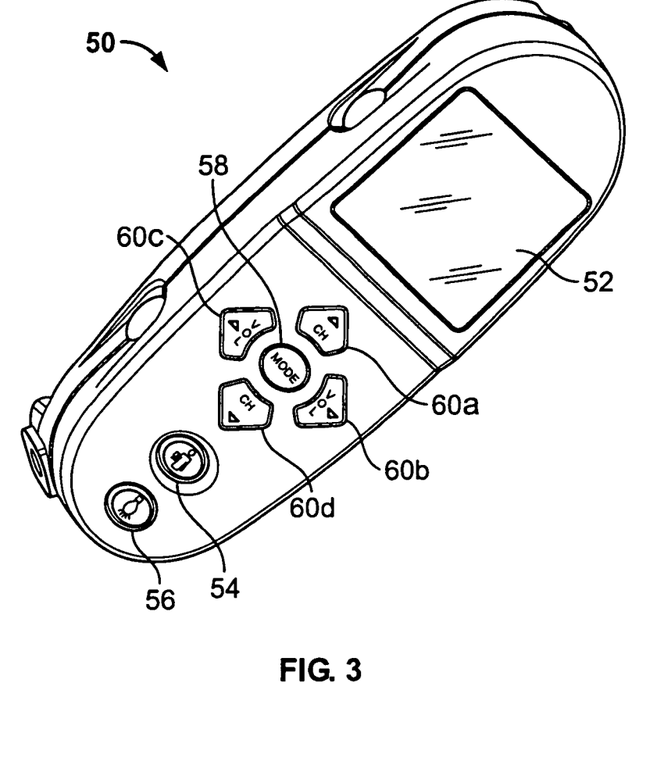
FIG. 3 is a perspective view of an embodiment of the PCU.

FIG. 3 is a perspective view illustrating the front of one possible embodiment of the PCU 32. Referring to FIG. 3, PCU 32 includes a chassis 50, a display panel 52, a flight attendant call button 54, a reading light button 56 for turning the passenger reading light on or off, a mode button 58, and an X-pad keyboard (collectively referred to as 60) with an upper "CH" button 60a, a lower "CH" button 60d, a right "VOL" button 60b and a left "VOL" button 60c.

Using the PCU 32, the passenger can control the volume of the audio he or she hears. The PCU 32 controls the volume by sending a signal, over the USB interface, which controls the amplifiers in the SEB 16. In an embodiment, the PCU 32 has buttons that control the volume UP 60c and DOWN 60b. The buttons 60b, 60c have an UP arrow or a DOWN arrow on them and the "VOL" heading is displayed on the PCU's display panel 52. If the PCU 32 is used in stand-alone mode, then the audio output is calibrated to give out 75 mW rms into each 300 Ohms transducer (1 kHz sinewave) at the maximum volume setting. The audio volume control provides 32 attenuation steps and each step is a 2 dB change. At power up the audio is set to −14 dB (7 steps down from the maximum). The audio volume control may be limited for passenger announcement and/or public address (PA) operations.

The PCU 32 can play a variety of audio file formats, including MPEG, MP2, MP3, DVD and DAT. When playing an audio file, the PCU 32 outputs an audio signal to the SEB 16. The maximum volume signal produces an output level of 0 dB into 600 Ohms (2.2 Vpp) as specified in WAEA-1289-1 and WAEA-1289-2. The total harmonic distortion (THD) of the audio output into 600 Ohms is less than 1% over the audio bandwidth of 50 Hz to 15 kHz. The frequency response has an amplitude variation of less than 3 dB over the audio bandwidth of 50 Hz to 15 kHz and the signal to noise ratio at the maximum volume (0 dBM output) is 55 dB or higher.

The PCU 32 has a single button for the attendant call function 54. This button is normally not illuminated. When the attendant call button 54 is depressed, it activates an LED backlight that illuminates it and sends a message to the SEB 16, via the USB interface, that an attendant call has occurred. If the LED light is illuminated and the passenger presses the attendant call button 54 again, a signal resetting the attendant call is sent and the button 54 is no longer illuminated. The SEB 16 is also able to reset the attendant call based on a database update. Similar to that described above, once the SEB 16 resets the attendant call, the light on the attendant call button 54 on the PCU 32 is turned off.

The PCU 32 can change from controlling the PCU 32 to controlling the VDU 34 and back again. In one embodiment a single button 58 located on PCU 32 changes the mode. While in the first mode, the PCU 32 controls a menu displayed on the display panel 52 located on the PCU 32. When the passenger presses the mode button 58, the PCU 32 enters a second mode and controls a menu displayed on the VDU 34. The PCU 32 can be used as a tool to navigate the display screens on either the PCU 32 itself or on the VDU 34. In one embodiment the PCU 32 uses the X-pad keyboard 60 to navigate the screens. On the X-pad keyboard 60, the up button 60a moves the cursor on a menu screen up, the down button 60d moves the cursor down, the a right button 60b moves the cursor to the right, and the left button 60c moves the cursor to the left of the screen. Depending on the mode selected, the user can use the X-pad keyboard 60 to navigate through either the menu on the PCU 32 or the menu on the VDU 34.

In an embodiment, the PCU 32 also has buttons to control the channel UP 60a and DOWN 60d. The buttons 60a and 60d have an UP arrow and a DOWN arrow on them and a "CH" heading is displayed on the display panel 52 of the PCU 32. Depending on whether the user has selected the mode for controlling the PCU 32 or the mode for controlling the VDU 34, these buttons may control the menu displayed on the display panel 52 of the PCU 32 or the menu displayed on the VDU 34.

In one embodiment, the PCU 32 has, four operation modes: Normal Operation, Maintenance Mode, Decompression Mode, and Degraded Functionality. The Normal Operation is the mode the PCU 32 enters when it is powered up and has received a status indicator for typical passenger operations as described in this document, whereas the PCU 32 enters the Maintenance Mode when it is powered up and receives a status indicator for entering the Maintenance Mode. The PCU 32 is not able to place itself in Maintenance Mode; it must receive an indicator to do so. Via software, the PCU 32 can detect the system Decompression State and enter Decompression Mode. In the Decompression Mode all passenger operations are stopped except for the PSS Passenger Services System. The PCU 32 exits the Decompression Mode by the power-on reset or by detecting the system Idle State. If the PCU 32 does not obtain a status indicator within a predetermined number of seconds of powering up or, if in normal operation, has not received a status indicator within a predetermined number of seconds, the PCU 32 enters the Degraded Functionality Mode. The PCU 32 only enters this mode from normal operation. If the PCU 32 has been placed in any other mode it remains in that mode until it has been removed or until the unit is no longer powered. The PCU 32 has Built in Test Equipment (BITE) that provides functions such as a watchdog timer, temperature sensor, and monitoring of voltages provided to the OMAP Processor (1.6V) and USB (5V).

Figure 4:
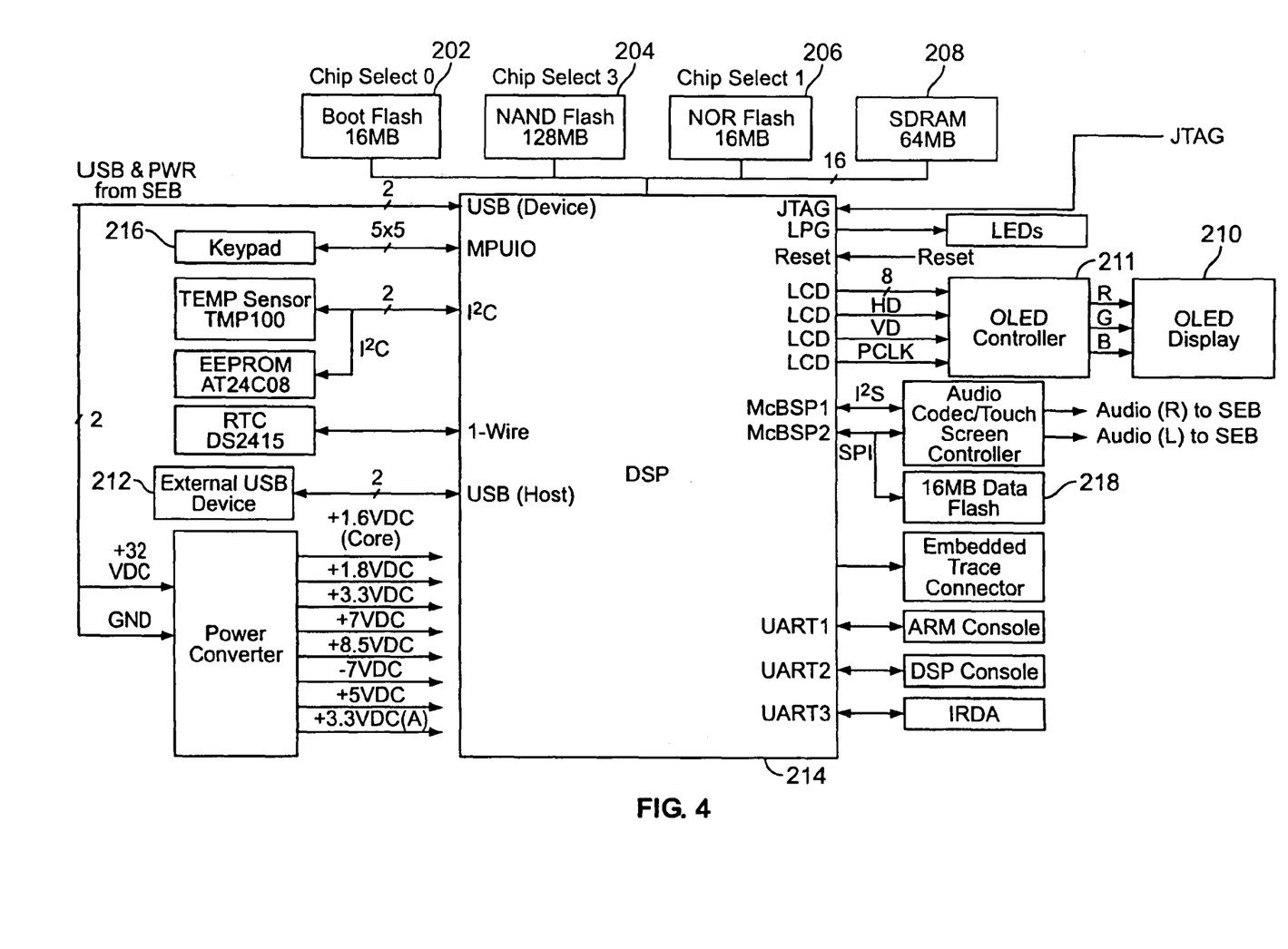
FIG. 4 is a block diagram illustrating an embodiment of the PCU.

The main components of the PCU 32 are a display panel (OLED or LCD display), a Main Printed Circuit Board Assembly (Main PCBA), a Keypad Printed Circuit Board Assembly (Keypad PCBA), chassis, and a cradle. Referring to FIGS. 3 and 4, various components of the PCU 32 in an embodiment of the invention will now be described. The display panel 52 is an OLED display 210. One such display panel 52 is a Kodak OLED AM550L. The Kodak OLED AM550L has a display size of 2.16 in (diagonal) and an active area of 1.72 inches horizontal and 1.29 inches vertical. The other characteristics of that embodiment of an OLED display are as follows: 521×218 (Horizontal×Vertical) pixels; a contrast ratio of 100:1; a brightness of 120 cd/m$^2$; and a viewing angle of 170° top to bottom and 170° left to right. The OLED display 210 is communicatively linked to an OLED Controller 211 which is communicatively linked to the Main PCBA. One such controller is the Kodak KDP01100. The Main PCBA is communicatively linked to the Keypad PCBA 216.

The Main PCBA provides all the functions required by the PCU, the DC-DC conversion and processor functions. The Main PCBA has 16 MByte Boot Flash memory 202, up to 128 MByte NAND Flash memory 204, 16 MByte NOR Flash memory 206, and 64 MByte of Synchronous Dynamic Random Access Memory (SDRAM) 208. The Main PCBA has a dual-core processor. An example of such a processor is the Texas Instruments OMAP5910 Processor 214, which incorporates a Data Signal Processor (DSP) core and embedded Reduced Instruction-Set Computer (RISC) microprocessor technology in the Advanced RISC Machine (ARM) core. The Keypad Printed Circuit Board Assembly (Keypad PCBA) 216 provides the button switch matrix which is continuously scanned by the processor 214 of the Main PCBA. The chassis, which holds these components, is the primary EMI and fluid shield for the unit. The chassis holds the OLED display 210, the Main PCBA, and the Keypad PCBA 216. The cradle has the cord reel assembly and a means to securely hold the tethered unit in place. The cord reel meets the requirements as stated in USB 1.1 specification for the data wires. The PCU 32 hardware includes BIOS for the Processor 214. The PCU 32 has programming code to allow it to boot the processors, download the application program code, and perform peripheral initialization and monitoring of status lines. The application software is downloaded into the PCU 32 and resides in the 128 MB NAND FLASH. Integrated Circuit 204. The application software provides the high level interface to external Line Replaceable Units (LRUs), and controls the PCU operations. The table below describes the Firmware (non-downloadable software) Partition for the PCU.

| Type | Description | Primary Functions |
|---|---|---|
| BIOS | S/W Kit, OMAP5910 Processor BIOS code | Devices initialization for OMAP5910, Audio Codec (TSC2100), Power Controller (TPS65010), SDRAM (MT48LC32M16A2) POST |

The table below describes the downloadable software partition.

| Type | Description | Primary Functions |
|---|---|---|
| Application | Linux Kernel | Linux Kernel and device drivers BITE |
| Application | Main Application Program | Main Application Browser server/client BITE |

The PCU 32 is able to operate at a nominal 32 VDC with max range of 28 VDC to 36 VDC of input power. The PCU 32 uses internal DC-DC switchers and Low Dropout Regulators (LDO) to create all required voltages used by the PCU 32 internal electronic circuits. The PCU 32 outputs a nominal 5 VDC per Universal Serial Bus Specification Revision 1.1. The output current of 20 mA provides power to approved external USB memory devices. The output current is limited in hardware to prevent damage and disruption of the PCU 32.

External and internal connector and interface information such as pinouts and input/output signal definitions are summarized in the table below.

| Connector | Function | Type | Pins Used |
|---|---|---|---|
| J1 | I/O Interface | External | 8 |
| J3 | Embedded Trace Macrocell | Internal | 24 |
| J5/J11 | Keypad Interface | Internal | 24 |
| J8 | OLED Interface | Internal | 32 |
| J9 | USB Connector | External | 4 |
| J10 | JTAG Interface | Internal | 20 |

The PCU 32 has two external connectors: one to interface with the SEB (J1) and one to interface with approved external USB memory devices (J9). The external Input/Output (I/O) Connector J1 has a connector specification of: SS-610808-NF-P-5, and uses an SS-310808-5 mating connector. The pin assignment on this connector is listed in the table below.

| Pin Number | Signal Description |
|---|---|
| 1 | SEB_VIN |
| 2 | SEB_USB_FUNC_DATA+ |
| 3 | SEB_USB_FUNC_DATA− |
| 4 | SEB_VIN_RTN |
| 5 | SEB_DISCRETE0 |
| 6 | SEB_AUD_IPCU_L |
| 7 | SEB_AUD_IPCU_R |
| 8 | SEB_IPCU_STOWED |

The external USB Mini-A-B Connector Interface J9 has a connector specification of 56579-0578 and uses standard A to 5 pin Mini B Device Cable mating connectors. The pin assignment on this connector is listed in the table below.

| Pin Number | Signal Description |
|---|---|
| 1 | USB_HOST_PWR |
| 2 | USB_HOST_DATA− |
| 3 | USB_USB_DATA+ |
| 4 | Digital Ground |

The internal connectors/interfaces JP 1 and JP2 are jumpers used for resetting power. The pin assignments for JP1 are shown in the tables below.

| Pin Number | Signal Description |
|---|---|
| 1 | Digital Ground |
| 2 | PWR_HOT_RESET |

The pin assignments for JP2 are shown in the table below.

| Pin Number | Signal Description |
|---|---|
| 1 | +5 V |
| 2 | PWR_PB_ONOFF |

The J3 Embedded Trace Macrocell Interface provides debug and trace facilities for the ARM processor. The connector specification is 52435-2491. No mating connector is required because it uses a 24 pin flat flex cable to interface. The pin assignments on this connector are listed in the following table.

| Pin Number | Signal Description |
|---|---|
| 1 | +3.3 V |
| 2 | +3.3 V |
| 3 | +3.3 V |
| 4 | Not connected |
| 5 | ETM Data0 |
| 6 | ETM Data1 |
| 7 | ETM Data2 |
| 8 | ETM Data3 |
| 9 | ETM Data4 |
| 10 | ETM Data5 |
| 11 | ETM Data6 |
| 12 | ETM Data7 |
| 13 | Not connected |
| 14 | ETM Clock |
| 15 | Not connected |
| 16 | ETM PSTAT1 |
| 17 | ETM PSTAT2 |
| 18 | Not connected |
| 19 | ETM PSTAT0 |
| 20 | ETM SYNC |
| 21 | Not connected |
| 22 | Digital Ground |
| 23 | Digital Ground |
| 24 | Digital Ground |

The J5/J11 keypad interface has two identical 12-pin connectors with spring-loaded contacts installed to the Keypad PCBA and that mate to pads of the Main PCBA. The Connector specification is 813-22-012-30-002-101. The pin assignment for the J5 Keypad Interface connector is listed in the table below.

| Pin Number | Signal Description |
| --- | --- |
| 1 | KEYB_R0 |
| 2 | KEYB_C0 |
| 3 | KEYB_R1 |
| 4 | KEYB_C1 |
| 5 | KEYB_R2 |
| 6 | KEYB_C2 |
| 7 | KEYB_R3 |
| 8 | KEYB_C3 |
| 9 | KEYB_R4 |
| 10 | KEYB_C4 |
| 11 | Digital Ground |
| 12 | KEYB_C5 |

The pin assignment for the J11 Keypad Interface is listed in the table below.

| Pin Number | Signal Description |
| --- | --- |
| 1 | +3.3 V |
| 2 | +5 V |
| 3 | +3.3 V |
| 4 | +5 V |
| 5 | KEYB_GPIO0 |
| 6 | KEYB_GPIO2 |
| 7 | KEYB_GPIO1 |
| 8 | KEYB_GPIO3 |
| 9 | Digital Ground |
| 10 | Digital Ground |
| 11 | Digital Ground |
| 12 | Digital Ground |

The J8 OLED Interface Connector specification is XF2H-3215-1. The pin assignment on this connector is listed in the tables below:

| Pin Number | Signal Description |
| --- | --- |
| 1 | Not Connected |
| 2 | DISP_CKV1 |
| 3 | DISP_CKV2 |
| 4 | DISP_STV |
| 5 | DISP_XSTV |
| 6 | +8.5 V |
| 7 | DISP_XENB |
| 8 | DISP_ENB |
| 9 | Digital Ground |
| 10 | DISP_CSV_PNL |
| 11 | DISP_VBB |
| 12 | −7 V |
| 13 | −7 V |
| 14 | −7 V |
| 15 | −7 V |
| 16 | +7 V |
| 17 | +7 V |
| 18 | +7 V |
| 19 | +7 V |
| 20 | Digital Ground |
| 21 | DISP_BLU |
| 22 | DISP_RED |
| 23 | DISP_GRN |
| 24 | DISP_CSH_PNL |
| 25 | Not Connected |
| 26 | Digital Ground |
| 27 | DISP_STH |
| 28 | DISP_XSTH |
| 29 | +8.5 V |
| 30 | DISP_CKH1 |
| 31 | DISP_CKH2 |
| 32 | Not Connected |

The J10 JTAG and UART Interface connector specification is 51374-2093. It requires 20 pin flat flex cable to interface. The pin assignment on this connector is listed in the table below.

| Pin Number | Signal Description | Notes |
| --- | --- | --- |
| 1 | OMAP_TRST | |
| 2 | +3.3 V | |
| 3 | ICE_TRST | |
| 4 | ICE_ZDD | |
| 5 | ICE_CONN_OMAP | TDI—Test Data In |
| 6 | Digital Ground | |
| 7 | ICE_TMS | |
| 8 | Digital Ground | |
| 9 | OMAP_TCK | |
| 10 | Digital Ground | |
| 11 | ICE_TCK_RET | |
| 12 | Digital Ground | |
| 13 | ICE_OMAP_CONN | TDO—Test Data Out |
| 14 | UART1_TX | |
| 15 | ICE_OMAP_RESET | |
| 16 | UART1_RX | |
| 17 | OMAP_EMU0 | |
| 18 | UART2_TX | |
| 19 | OMAP_EMU1 | |
| 20 | UART2_RX | |

The PCU 32 has built-in test equipment (BITE) and performs intrusive and non-intrusive tests. An intrusive test is performed when commanded by the host. A non-intrusive test is performed periodically during normal operation. The PCU 32 periodically performs non-intrusive tests that monitor PCU 32 status in flight to verify the fault-free system operation. Should a fault be detected, the fault is recorded in a non-memory volatile memory (NVM) for later investigation on-board and in the workshop. As a guideline, the NVM capacity will record fault data for at least 256 faults covering at least 64 flight legs. Each reported fault will have a corresponding message stored in NVM. A fault detected by various BITE tests will have the same error message and record. Faults are not announced on the first occurrence until detection is confirmed. Intermittent faults are stored only one time. Non-intrusive tests include the following tests: USB port status, processor operational status, PA status, and a Decompression status. Each reported fault has a corresponding message stored in NVM. A fault detected by various BITE modes has the same error message and record. Faults are not announced on the first occurrence until detection is confirmed. Intermittent faults are stored only one time.

The PCU 32 performs intrusive tests, initiated by the Maintenance Terminal on the ground to identify latent failures and to allow for a speedy system return to service testing, without additional test equipment, after completion of maintenance actions. Results from the intrusive test are reported in less than 10 seconds. The intrusive test includes the following tests: all non-intrusive tests, audio data streaming, and audio data download.

The PCU 32 performs a power-on self-test (POST) on initial power-up or after a long power interrupt. When there is no confirmed failure, the unit becomes operational in less than 5 minutes following the establishment of the power supply. POST performs the following tests: all tests listed in the non-intrusive test section, the main processor memory test, and the application memory content integrity test.

The PCU has a 1.0 lb maximum weight and dimensions (H×W×D) of 2.95×7.86×1.75 inches. The PCU does not require force-air-cooling. The PCU is cooled by natural convection and radiation. The PCU is designed with fault tolerance such that under failure conditions, the PCU will not halt the system operations.

The Mean Time to Repair (MTTR) the PCU is less than 18 minutes. The MTTR is the time it takes to remove and replace the PCU, load the appropriate operating software, and perform a return to service test. All exterior surfaces of the PCU are designed to withstand exposure to isopropyl alcohol, household ammonia, food acids (e.g., lemon juice and soft drinks) and commercial cleaning agents. All exterior surface finishes are designed to withstand the abrasion of industrial cleaning pads soaked in commercial cleaning agents.

All references, including publications, patent applications, and patents, cited herein, are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A hand-held passenger control unit adapted for use by a passenger on an aircraft, the control unit comprising:
   a controller;
   a memory;
   a display panel; and
   a port for receiving a portable external memory containing audio content,
   wherein the control unit has a normal mode of operation including at least a first and second normal mode of operation;
   wherein the first normal mode of operation the control unit controls the display panel disposed on the control unit to navigate through a menu displayed on the display panel on the control unit, wherein the display panel has a diagonal dimension of at least about 2.0 inches;
   wherein the second normal mode of operation, the control unit controls a video display unit that is separate from the control unit and disposed proximate to the passenger;
   wherein the control unit is configured to have four modes, the normal operation mode entered after receiving a status indicator for passenger operations; a maintenance mode entered after receiving a status indicator for entering maintenance mode; a decompression mode entered after a decompression state is detected; and a degraded functionality mode entered after not receiving a status indicator within a predetermined amount of time.

2. The control unit of claim 1, wherein, in response to a user's manipulation, the control unit is configured to control the volume of an amplifier that is external to the control unit.

3. The control unit of claim 2, wherein the control unit is configured to display a heading indicative of volume on the display panel.

4. The control unit of claim 2, wherein the control unit is further configured to transmit a signal to limit the volume of the amplifier during a passenger announcement or public address.

5. The control unit of claim 1, wherein the control unit, in response to manipulation by the user, is configured to control the menu displayed on the video display unit.

6. The control unit of claim 5, further comprising a substantially X-shaped keypad.

7. The control unit of claim 1, wherein the display panel is an organic light emitting diode (OLED) or liquid crystal display (LCD) display, and wherein the control unit further comprises a system interface through which data or a stereo audio signal is provided to an in-flight entertainment system of the aircraft.

8. The control unit of claim 1, further comprising an audio decoder configured to decode songs downloaded from the external memory positioned in the port.

9. The control unit of claim 1, further comprising a call attendant mechanism and an associated light emitting diode (LED), wherein activation of the call attendant mechanism causes illumination of the LED.

10. The control unit of claim 9, wherein the control unit is communicatively linked to an in-flight entertainment system of the aircraft, and wherein a signal received by the control unit from the in-flight entertainment system turns the LED off.

11. A method of delivering multimedia content to an aircraft passenger, the method comprising:
   providing a video display unit disposed proximate to the passenger;
   providing a control unit for the video display unit, the control unit including a hand-held audio player separate from the video display unit, the control unit having a normal mode of operation including at least first and second normal modes of operation and being configured to:
      operate in the first normal mode of operation to control a display panel disposed on the control unit to navigate through a menu displayed on the display panel on the control unit, wherein the display panel has a diagonal dimension of at least about 2.0 inches; and
      operate in the second normal mode of operation to control a video display unit that is separate from the control unit and disposed proximate to the passenger;
   providing a headset, wherein the control unit is configured to have four modes, the normal operation mode entered after receiving a status indicator for passenger operations; a maintenance mode entered after receiving a status indicator for entering maintenance mode; a decompression mode entered after a decompression state is detected; and a degraded functionality mode entered after not receiving a status indicator within a predetermined amount of time;
   providing video content from an on-board computer network to the video display unit and operating the video display unit to display the video content to the passenger;

connecting an external memory device to the audio player, and operating the audio player to download audio content from the external memory device;

operating the video display unit to display information corresponding to audio files in the downloaded audio content;

operating the control unit to navigate about the information displayed on the video display unit to select a said audio file; and providing audio content in the selected audio file from the hand-held audio player to the headset.

12. The method of claim 11, further comprising the audio player detecting the audio content on the external memory device and displaying data regarding the audio content on a display screen integrated with the audio player.

13. The method of claim 11, wherein providing the video display unit, the control unit and the headset further comprise coupling the video display unit, the control unit and the headset to an electronics box disposed proximate to a passenger's seat, the electronics box being separate from the video display unit and the hand-held audio player.

14. The method of claim 12, wherein the audio content is an audio data file, and wherein the method further comprises selecting by title the audio data file to download.

15. The method of claim 13, further comprising providing power to the external memory device.

16. A system for providing in-flight entertainment to a passenger on an aircraft, the system comprising:
a computer network;
a video display unit disposed proximate to a passenger seat on the aircraft, the video display unit being communicatively linked to the computer network, the video display unit receiving multimedia content from the computer network; and
a passenger control unit having a normal mode of operation including at least first and second normal modes and being communicatively linked to and separate from the video display unit, the passenger control unit executing software for downloading audio files and transmitting them to a speaker for permitting the passenger control unit to control the functioning of the video display unit to display information corresponding to the downloaded audio files and to navigate about the information displayed on the video display unit to select an audio file in the first normal mode of operation, the passenger control unit having the second normal mode of operation wherein the passenger control unit is configured to control a display panel disposed on the passenger control unit to navigate through a menu displayed on the display panel on the control unit, wherein the display panel has a diagonal dimension of at least about 2.0 inches and
wherein the control unit is configured to have four modes, the normal operation mode entered after receiving a status indicator for passenger operations; a maintenance mode entered after receiving a status indicator for entering maintenance mode; a decompression mode entered after a decompression state is detected; and a degraded functionality mode entered after not receiving a status indicator within a predetermined amount of time.

17. The system of claim 16, further comprising a built in test unit including a temperature sensor and a device to monitor voltages provided to the passenger control unit.

18. The system of claim 16, wherein the passenger control unit further comprises a display panel, a controller, a memory, a universal serial bus (USB) interface and a user input mechanism.

19. The system of claim 18, further comprising an external device configured to connect to the passenger control unit by the USB interface and from which the audio tiles can be downloaded into the passenger control unit.

20. The control unit of claim 1, further comprising a button configured to switch the control unit between the first mode of operation and the second mode of operation.

21. The control unit of claim 1, wherein the control unit is wirelessly coupled to the video display unit.

* * * * *